US012634589B2

(12) United States Patent
Liu

(10) Patent No.: US 12,634,589 B2
(45) Date of Patent: May 19, 2026

(54) IMAGE GENERATION METHOD AND ELECTRONIC DEVICE

(71) Applicant: VIVO MOBILE COMMUNICATION CO., LTD., Guangdong (CN)

(72) Inventor: Zhiwen Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 186 days.

(21) Appl. No.: 18/424,819

(22) Filed: Jan. 28, 2024

(65) Prior Publication Data

US 2024/0196101 A1 Jun. 13, 2024

Related U.S. Application Data

(63) Continuation of application No. PCT/CN2022/107869, filed on Jul. 26, 2022.

(30) Foreign Application Priority Data

Jul. 28, 2021 (CN) .......................... 202110859072.1

(51) Int. Cl.
H04N 23/745 (2023.01)
G06T 5/50 (2006.01)
(Continued)

(52) U.S. Cl.
CPC ............. H04N 23/745 (2023.01); G06T 5/50 (2013.01); H04N 23/71 (2023.01); H04N 23/73 (2023.01); G06T 2207/20221 (2013.01)

(58) Field of Classification Search
None
See application file for complete search history.

(56) References Cited

U.S. PATENT DOCUMENTS

| | | | |
|---|---|---|---|
| 2005/0246143 A1 | 11/2005 | Han et al. | |
| 2010/0123810 A1 | 5/2010 | Greenland et al. | |
| 2023/0131228 A1* | 4/2023 | Wang | G06T 5/70 |
| | | | 382/275 |

FOREIGN PATENT DOCUMENTS

| | | |
|---|---|---|
| CN | 102273194 A | 12/2011 |
| CN | 111127354 A | 5/2020 |

(Continued)

OTHER PUBLICATIONS

English translation of JP-2012126040-A, Inamoto, 2012 (Year: 2012).*

(Continued)

*Primary Examiner* — James M Hannett
(74) *Attorney, Agent, or Firm* — BROOKS KUSHMAN P.C.

(57) ABSTRACT

An image generation method and an electronic device, and relates to the field of image processing technologies. The method includes: obtaining a first image, the first image including M×N pixel points, where M and N are positive integers; determining a light source brightness function; performing, based on a preset parameter, a time-domain integral operation on the light source brightness function for M times, to obtain M brightness values; generating a second image based on the M brightness values, the second image being a stripe image having M×N pixel points, where brightness values of pixel points in M rows in the second image respectively correspond to the M brightness values; and fusing the first image and the second image into a flicker banding image.

19 Claims, 9 Drawing Sheets

(51) Int. Cl.
    *H04N 23/71*     (2023.01)
    *H04N 23/73*     (2023.01)

(56)       References Cited

FOREIGN PATENT DOCUMENTS

| | | | |
|---|---|---|---|
| CN | 111131722 A | 5/2020 | |
| CN | 111355864 A | 6/2020 | |
| CN | 112383718 A | 2/2021 | |
| CN | 113592754 A | 11/2021 | |
| JP | 2012126040 A | * 7/2012 | |
| JP | 6797400 B2 | * 12/2020 | |
| WO | WO-2021074122 A1 | * 4/2021 | ........... H04N 23/667 |
| WO | WO-2022213683 A1 | * 10/2022 | ............. H04N 23/72 |

OTHER PUBLICATIONS

English translation of JP-6797400-B2, 2020 (Year: 2020).*

English translation of WO-2022213683-A1, Cui, 2022 (Year: 2022).*

Extended European Search Report for Application No. 22848515.7, dated Sep. 26, 2024, 13 Pages.

Digital Photography III "Illumination Flicker Correction and Frequency Classification Methods" SPIE-1S&T/ vol. 6502 650210-1, 2007, 10 Pages.

International Search Report and Written Opinion for Application No. PCT /CN2022/107869, dated Oct. 10, 2022, 7 Pages.

* cited by examiner

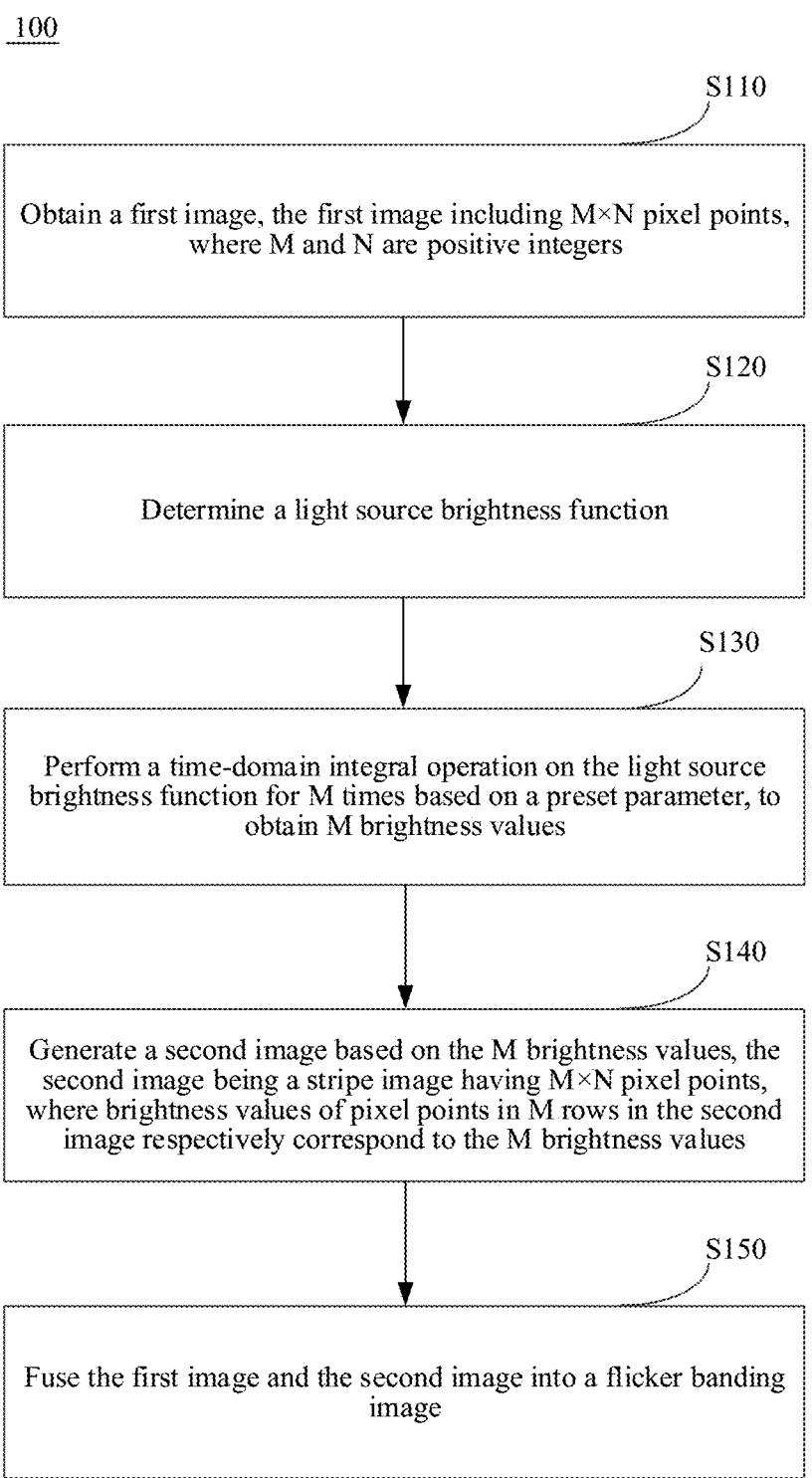

100

S110

Obtain a first image, the first image including M×N pixel points, where M and N are positive integers

S120

Determine a light source brightness function

S130

Perform a time-domain integral operation on the light source brightness function for M times based on a preset parameter, to obtain M brightness values

S140

Generate a second image based on the M brightness values, the second image being a stripe image having M×N pixel points, where brightness values of pixel points in M rows in the second image respectively correspond to the M brightness values

S150

Fuse the first image and the second image into a flicker banding image

FIG. 1

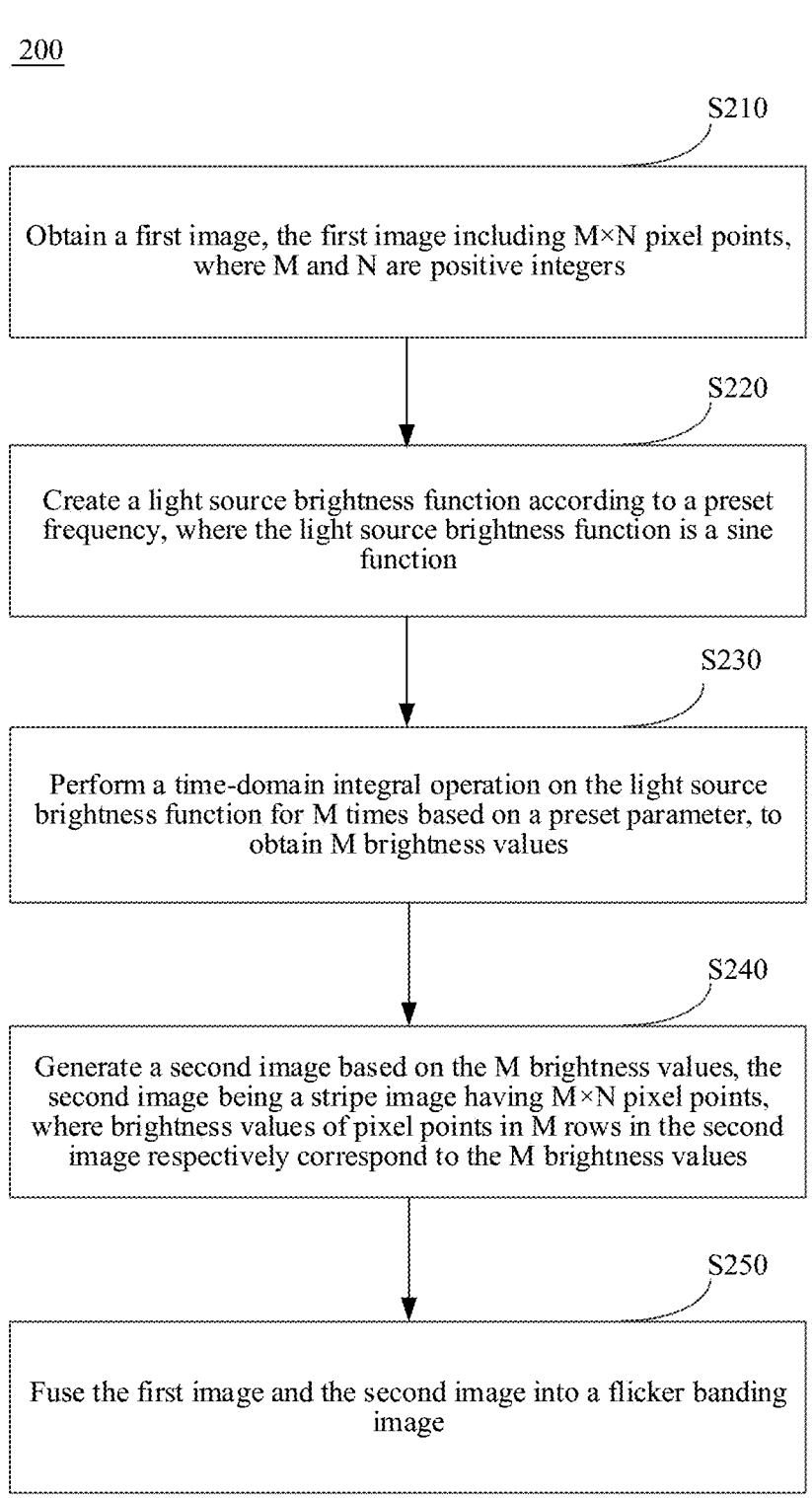

200

S210

Obtain a first image, the first image including M×N pixel points, where M and N are positive integers

S220

Create a light source brightness function according to a preset frequency, where the light source brightness function is a sine function

S230

Perform a time-domain integral operation on the light source brightness function for M times based on a preset parameter, to obtain M brightness values

S240

Generate a second image based on the M brightness values, the second image being a stripe image having M×N pixel points, where brightness values of pixel points in M rows in the second image respectively correspond to the M brightness values

S250

Fuse the first image and the second image into a flicker banding image

FIG. 2

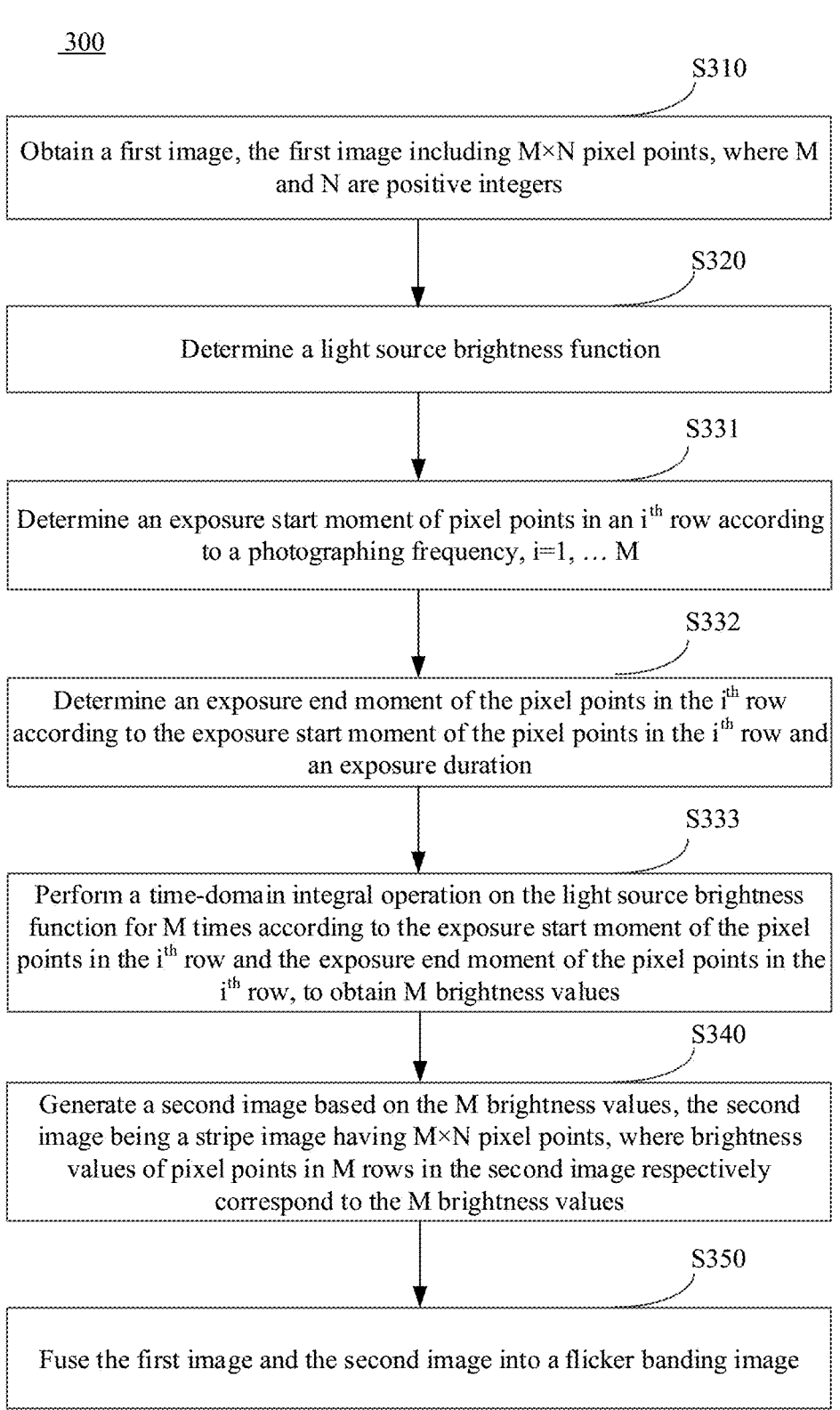

300

S310

Obtain a first image, the first image including M×N pixel points, where M and N are positive integers

S320

Determine a light source brightness function

S331

Determine an exposure start moment of pixel points in an i$^{th}$ row according to a photographing frequency, i=1, ... M

S332

Determine an exposure end moment of the pixel points in the i$^{th}$ row according to the exposure start moment of the pixel points in the i$^{th}$ row and an exposure duration

S333

Perform a time-domain integral operation on the light source brightness function for M times according to the exposure start moment of the pixel points in the i$^{th}$ row and the exposure end moment of the pixel points in the i$^{th}$ row, to obtain M brightness values

S340

Generate a second image based on the M brightness values, the second image being a stripe image having M×N pixel points, where brightness values of pixel points in M rows in the second image respectively correspond to the M brightness values

S350

Fuse the first image and the second image into a flicker banding image

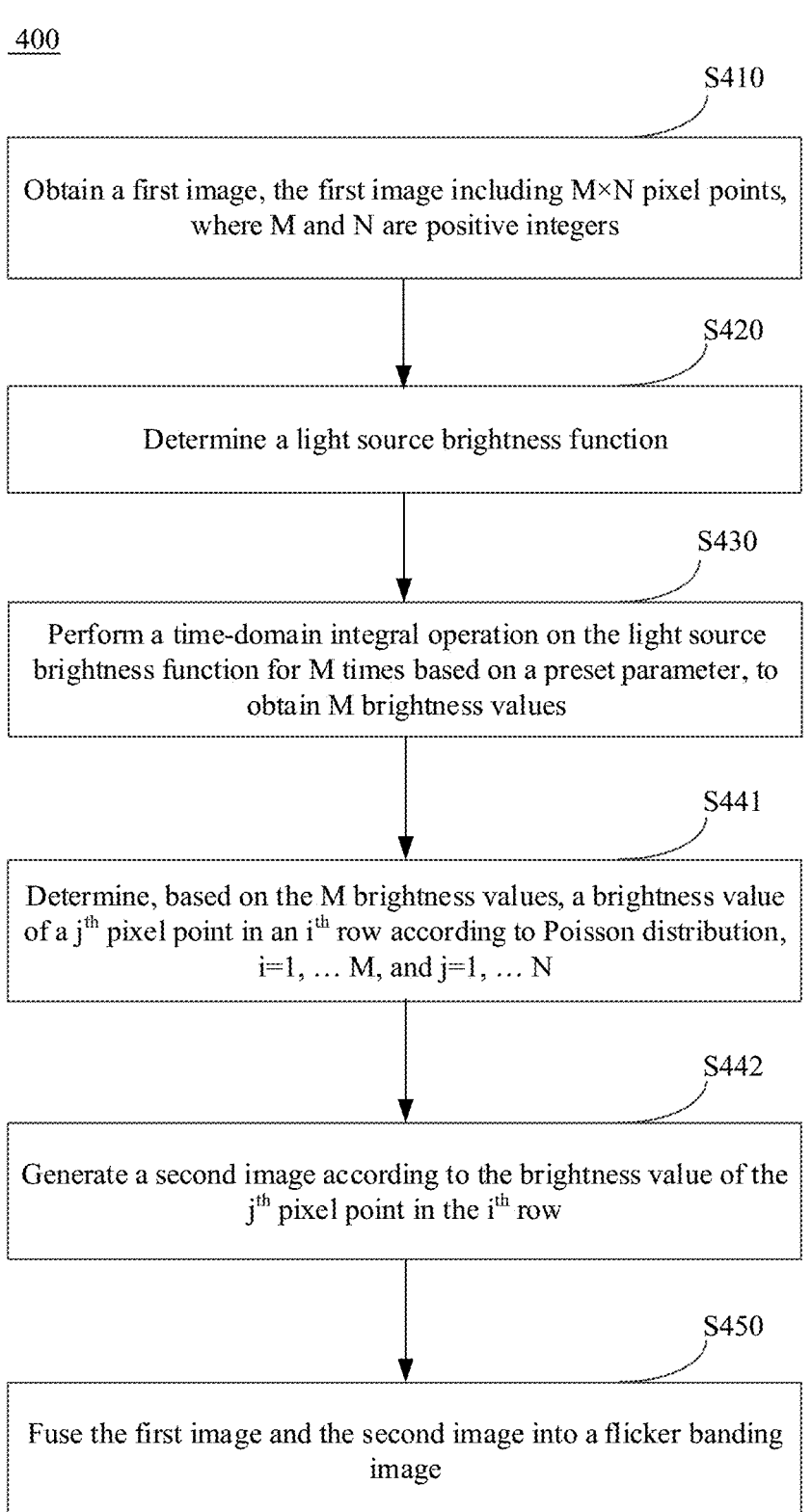

Obtain a first image, the first image including M×N pixel points, where M and N are positive integers

S420

Determine a light source brightness function

S430

Perform a time-domain integral operation on the light source brightness function for M times based on a preset parameter, to obtain M brightness values

S441

Determine, based on the M brightness values, a brightness value of a $j^{th}$ pixel point in an $i^{th}$ row according to Poisson distribution, i=1, ... M, and j=1, ... N

S442

Generate a second image according to the brightness value of the $j^{th}$ pixel point in the $i^{th}$ row

S450

Fuse the first image and the second image into a flicker banding image

FIG. 4

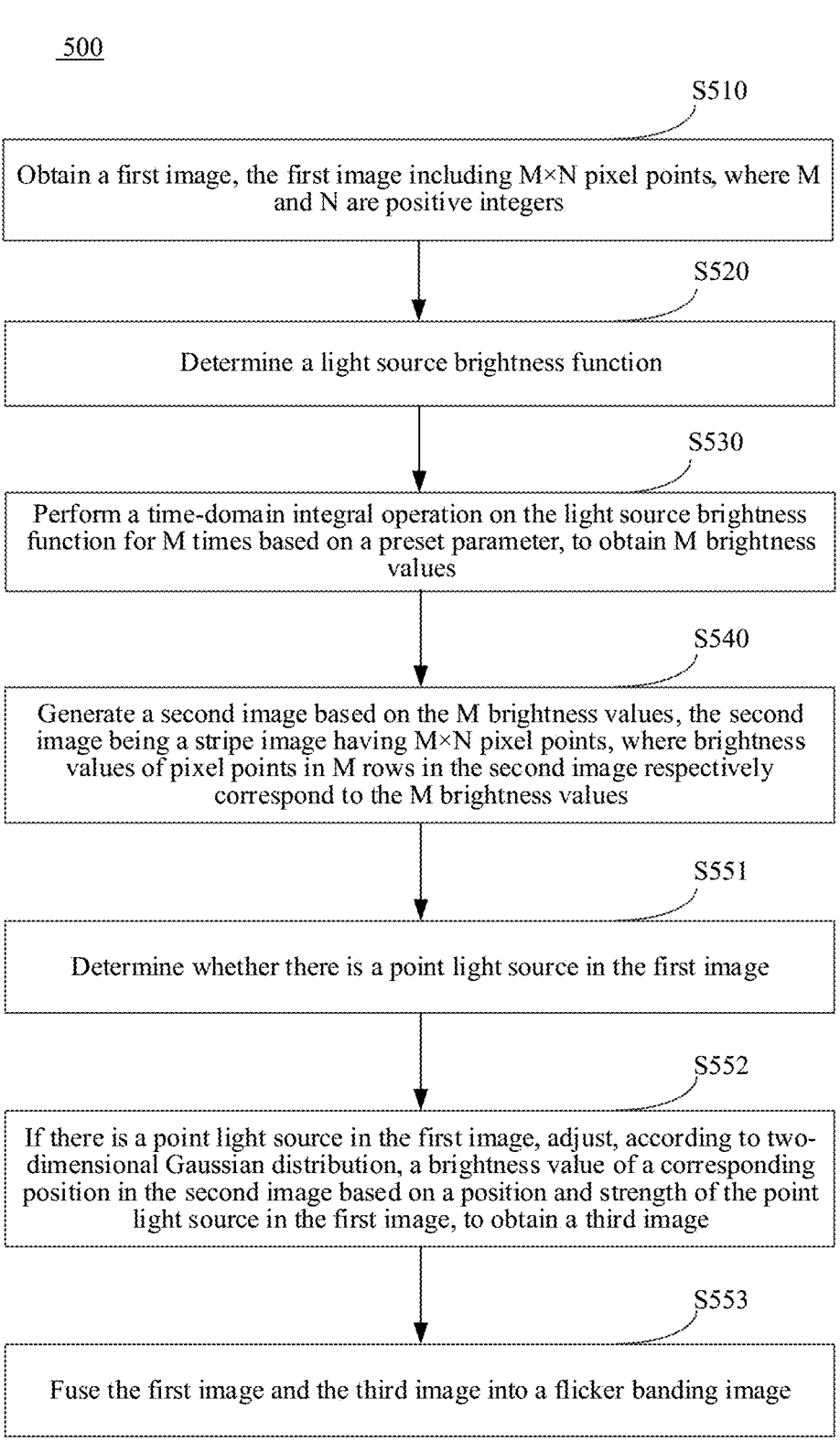

500

S510

Obtain a first image, the first image including M×N pixel points, where M and N are positive integers

S520

Determine a light source brightness function

S530

Perform a time-domain integral operation on the light source brightness function for M times based on a preset parameter, to obtain M brightness values

S540

Generate a second image based on the M brightness values, the second image being a stripe image having M×N pixel points, where brightness values of pixel points in M rows in the second image respectively correspond to the M brightness values

S551

Determine whether there is a point light source in the first image

S552

If there is a point light source in the first image, adjust, according to two-dimensional Gaussian distribution, a brightness value of a corresponding position in the second image based on a position and strength of the point light source in the first image, to obtain a third image

S553

Fuse the first image and the third image into a flicker banding image

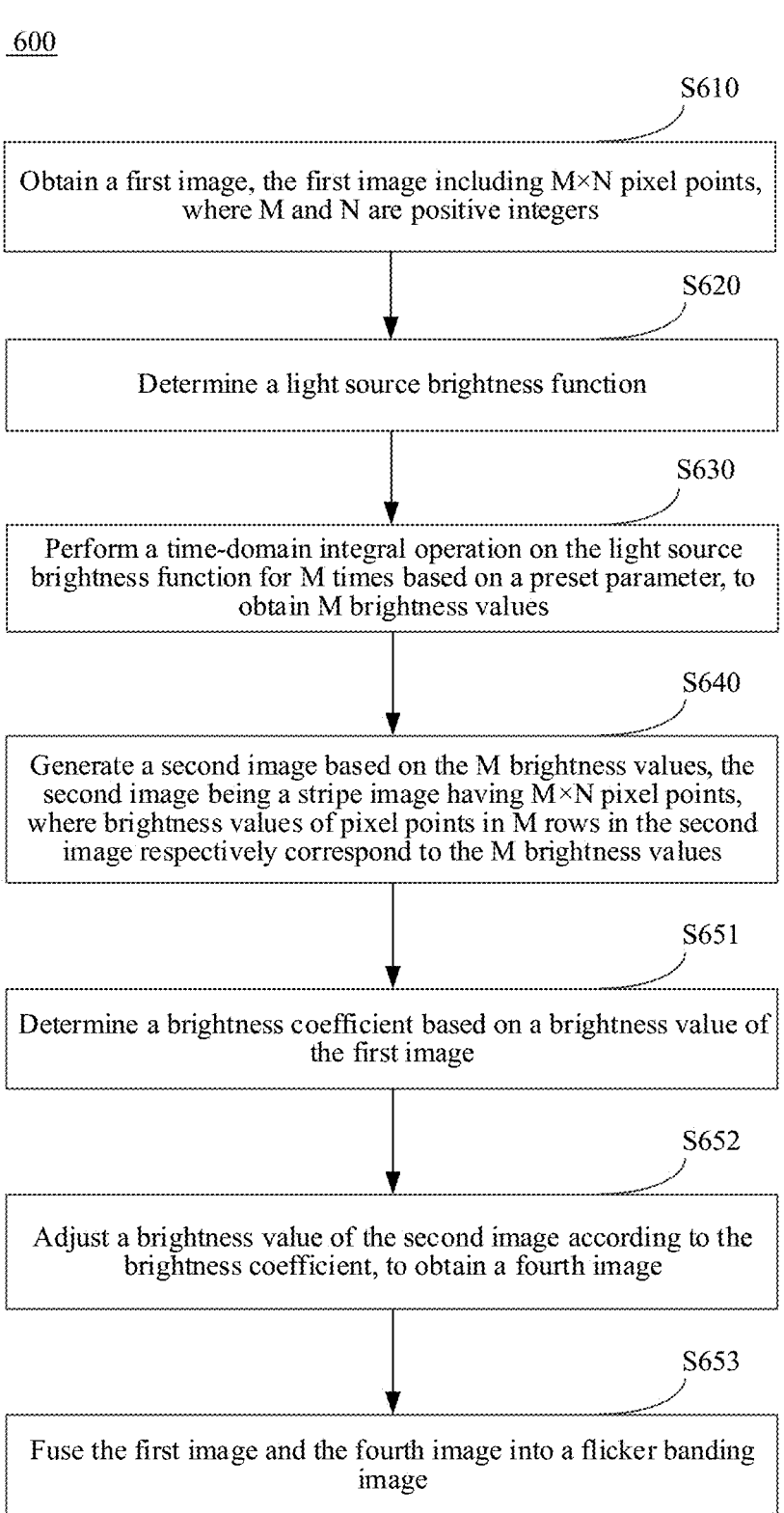

S610

Obtain a first image, the first image including M×N pixel points, where M and N are positive integers

S620

Determine a light source brightness function

S630

Perform a time-domain integral operation on the light source brightness function for M times based on a preset parameter, to obtain M brightness values

S640

Generate a second image based on the M brightness values, the second image being a stripe image having M×N pixel points, where brightness values of pixel points in M rows in the second image respectively correspond to the M brightness values

S651

Determine a brightness coefficient based on a brightness value of the first image

S652

Adjust a brightness value of the second image according to the brightness coefficient, to obtain a fourth image

S653

Fuse the first image and the fourth image into a flicker banding image

FIG. 6

Position $P_{loc}$ (x,y), and strength $P_s$ (x,y)

900

910

Obtaining module

920

Determining module

930

Operation module

940

Image generation module

950

Image fusion module

1000

Electronic device

1001

Processor

1002

Memory

IMAGE GENERATION METHOD AND ELECTRONIC DEVICE

CROSS-REFERENCE TO RELATED APPLICATIONS

This application is a continuation of International Application No. PCT/CN2022/107869 filed on Jul. 26, 2022, which claims priority to Chinese Patent Application No. 202110859072.1 filed on Jul. 28, 2021, which are incorporated herein by reference in their entireties.

TECHNICAL FIELD

This application relates to the field of image processing technologies, and in particular, to an image generation method and an electronic device.

BACKGROUND

If photography is performed by using a high-speed shutter under alternating current-powered lighting, a photographed image may have alternating light and dark strips. To remove the alternating light and dark strips on the image, users need to acquire paired pieces of training data for related algorithm research. Currently, to obtain the paired pieces of training data, a camera device is often fixed, and a set of images with different shutter speeds are photographed in a same scenario, that is, low shutter-speed images (where there are no alternating light and dark strips) and high shutter-speed images (where there are alternating light and dark strips).

However, such a manner has cumbersome operations, and there is a need to ensure height stability of the camera device and a photographed region. As a result, it is difficult to obtain a large amount of paired pieces of training data and obtain the training data in a dynamic scenario. In view of this, in the related art, there is a problem that there is a difficulty in obtaining a large amount of paired pieces of training data and obtaining the training data in the dynamic scenario.

SUMMARY

According to a first aspect, an embodiment of this application provides an image generation method, including: obtaining a first image, the first image including M×N pixel points, where M and N are positive integers; determining a light source brightness function; performing, based on a preset parameter, a time-domain integral operation on the light source brightness function for M times, to obtain M brightness values; generating a second image based on the M brightness values, the second image being a stripe image having M×N pixel points, where brightness values of pixel points in M rows in the second image respectively correspond to the M brightness values; and fusing the first image and the second image into a flicker banding image.

According to a second aspect, an embodiment of this application provides an image generation apparatus, including: an obtaining module, configured to obtain a first image, the first image including M×N pixel points, where M and N are positive integers; a determining module, configured to determine a light source brightness function; an operation module, configured to perform, based on a preset parameter, a time-domain integral operation on the light source brightness function for M times, to obtain M brightness values; an image generation module, configured to generate a second image based on the M brightness values, the second image being a stripe image having M×N pixel points, where brightness values of pixel points in M rows in the second image respectively correspond to the M brightness values; and an image fusion module, configured to fuse the first image and the second image into a flicker banding image.

According to a third aspect, an embodiment of this application provides an electronic device. The electronic device includes a processor, a memory, and a program or instructions stored in the memory and executable on the processor, the program or instructions, when executed by the processor, implementing the steps of the method according to the first aspect.

According to a fourth aspect, an embodiment of this application provides a readable storage medium, the readable storage medium storing a program or instructions, the program or instructions, when executed by the processor, implementing the steps of the method according to the first aspect.

According to a fifth aspect, an embodiment of this application provides a chip, including a processor and a communication interface, where the communication interface is coupled to the processor, and the processor is configured to run a program or instructions to implement the method according to the first aspect.

According to a sixth aspect, a computer program product is provided. The computer program product is stored in a non-transient storage medium, and the program product is executed by at least one processor to implement the method according to the first aspect.

According to a seventh aspect, an electronic device is provided. The electronic device is configured to perform the method according to the first aspect.

BRIEF DESCRIPTION OF THE DRAWINGS

FIG. 1 is a schematic flowchart of an image generation method according to an embodiment of this application;

FIG. 2 is a schematic flowchart of an image generation method according to another embodiment of this application;

FIG. 3 is a schematic flowchart of an image generation method according to another embodiment of this application;

FIG. 4 is a schematic flowchart of an image generation method according to another embodiment of this application;

FIG. 5 is a schematic flowchart of an image generation method according to another embodiment of this application;

FIG. 6 is a schematic flowchart of an image generation method according to another embodiment of this application;

DETAILED DESCRIPTION

Figure 7:
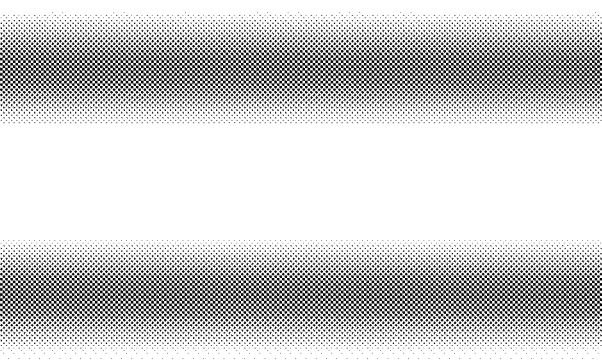
FIG. 7 is a schematic diagram of a second image according to an embodiment of this application.

The following clearly describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application fall within the protection scope of this application.

In the specification and the claims of this application, the terms "first", "second", and so on are intended to distinguish similar objects but do not necessarily indicate a specific order or sequence. It is to be understood that the terms termed in such a way is interchangeable in proper circumstances, so that the embodiments of this application can be implemented in other sequences than the sequence illustrated or described herein. In addition, the objects distinguished by "first", "second", and the like are usually of one type, and a number of objects is not limited, for example, there may be one or more first objects. In addition, "and/or" used in the specification and the claims represents at least one of the connected objects, and a character "/" in this specification generally indicates an "or" relationship between the associated objects.

An image generation method provided in the embodiments of this application are described in detail below with reference to the accompanying drawings by using specific embodiments and application scenarios thereof.

As shown in FIG. 1, an embodiment of this application provides an image generation method 100. The method may be performed by a terminal device. In other words, the method may be performed by software or hardware installed on the terminal device. The method includes the following steps.

S110: Obtain a first image, the first image including M×N pixel points, where M and N are positive integers.

The first image is an image that does not have alternating light and dark strips. A size of the first image is determined. For example, it is determined that the first image includes 40×30 pixel points, that is, the first image includes 40 rows of pixel points, and each row of pixel points includes 30 pixel points.

S120: Determine a light source brightness function.

The light source brightness function is used for representing a function relationship between a light source brightness and a time. For example, in a case that a power supply periodically changes with the time, the light source brightness may also periodically change with the time. In other words, the function relationship between the light source brightness and the time is represented by using a periodic function.

The light source brightness function may be at least one of preset light source brightness functions, or may be at least one of light source brightness functions created according to related parameters after the first image is obtained.

S130: Perform a time-domain integral operation on the light source brightness function for M times based on a preset parameter, to obtain M brightness values.

Considering that in reality, light collected by a photosensitive element in a camera device is essentially a number of photons collected by the photosensitive element within an exposure time period. Therefore, a time-domain integral operation may be performed on the light source brightness function to simulate collection of light performed by the photosensitive element.

The preset parameter is used for determining a time domain interval based on which the time-domain integral operation is performed on the light source brightness function. For example, $L=f(t)$ represents the light source brightness function, where L represents the light source brightness, and t represents the time. An integral of the light source brightness function in a time domain interval from $T_0$ to $T_1$ may be represented by $$\int_{T_0}^{T_1} f(t)dt.$$

The preset parameter is used for determining $T_0$ and $T_1$.

M time domain intervals are determined based on the preset parameter, and the time-domain integral operation is performed on the light source brightness function for M times based on the M time domain intervals, to obtain the M brightness values.

For example, the first image includes 40×30 pixel points. 40 time domain intervals are determined based on the preset parameter, and the time-domain integral operation is performed on the light source brightness function for 40 times based on the 40 time domain intervals, to obtain 40 brightness values.

The preset parameter may be set by a user according to requirements for algorithm research. Different preset parameters are set, to simulate and generate, under different photography conditions, alternating light and dark strips generated by photographing by using a high-speed shutter.

S140: Generate a second image based on the M brightness values, the second image being a stripe image having M×N pixel points, where brightness values of pixel points in M rows in the second image respectively correspond to the M brightness values.

It may be understood that, the M brightness values are used for determining the brightness values of the pixel points in the M rows in the second image.

In an implementation, brightness values of pixel points in an $i^{th}$ row in the second image are determined according to an $i^{th}$ brightness value in the M brightness values, where i=1, . . . M.

For example, the time-domain integral operation is performed on the light source brightness function for 40 times to obtain 40 brightness values. It is determined that brightness values of pixel points in the first row in the second image are all the first brightness value in the 40 brightness values, it is determined that brightness values of pixel points in the second row of the second image are all the second brightness values in the 40 brightness values, it is determined that brightness values of pixel points in the third row in the second image are all the third brightness value in the 40 brightness values . . . . In this way, the second image is generated based on the M brightness values, where the second image is a stripe image having M×N pixel points, and brightness values of pixel points in M rows in the second image respectively correspond to the M brightness values.

S150: Fuse the first image and the second image into a flicker banding image.

Sizes of the first image and the second image are exactly the same, meet a fusion condition, and do not need to be adjusted. The M×N pixel points included in the first image are in a one-to-one correspondence with the M×N pixel points included in the second image, and the first image and the second image may be fused in a multiplication manner. The first image is a normal scenario image and does not have alternating light and dark strips, and the second image is a stripe image. The first image and the second image are fused, that is, the stripe image is superimposed on the scenario image to obtain a flicker banding image. The flicker banding image and the first image constitute paired pieces of training data.

In this way, in the image generation method provided in this embodiment of this application, a first image is obtained, the first image including M×N pixel points, where M and N are positive integers; a light source brightness function is determined; a time-domain integral operation is performed on the light source brightness function for M times based on a preset parameter, to obtain M brightness values; a second image is generated based on the M brightness values, the second image being a stripe image having M×N pixel points, where brightness values of pixel points in M rows in the second image respectively correspond to the M brightness values; and the first image and the second image are fused into a flicker banding image. In this case, according to a generation principle of a stroboscopic strip, a flicker banding image paired with the first image can be generated through simulation, and based on different light source brightness functions and a plurality of sets of preset parameters, a large amount of non-repeated flicker banding images paired with the first image can be generated through simulation, so that requirements for algorithm research are met, and there is no need to use the camera device to photograph a high shutter-speed image in a same scenario as the first image to generate the flicker banding image, thereby resolving a problem that there is a difficulty in obtaining a large amount of paired pieces of training data and obtaining the training data in a dynamic scenario.

As shown in FIG. 2, an embodiment of this application provides an image generation method 200. The method further limits step S120 in the embodiment of FIG. 1 and includes the following steps:

S220: Create the light source brightness function according to a preset frequency, where the light source brightness function is a sine function.

Considering that in reality, a current of an alternating-current power supply usually presents a sine fluctuation of a frequency. For example, in different countries or regions, the current of the alternating-current power supply usually respectively presents a sine fluctuation of a frequency of 50 Hz or 60 Hz. The light source brightness is positively correlated to current strength of the alternating-current power supply. Therefore, the function relationship between the light source brightness function and the time may be expressed as:

$$L = |\sin(at)|$$

A frequency of a light source brightness change may be set by changing a coefficient a.

The preset frequency may be set by the user according to requirements for algorithm research. Different preset frequencies are set, and light source brightness functions under an alternating-current power supply of different frequencies are created, to simulate and generate, under different light source conditions, alternating light and dark strips generated by photographing by using a high-speed shutter.

In this embodiment of this application, steps S210 and S230 to S250 may use the descriptions of steps S110 and S130 to S150 in the embodiment of FIG. 1. Details are not described herein again.

In this way, the light source brightness function is created according to a preset frequency, where the light source brightness function is a sine function. In this case, the alternating-current power supply can be simulated by using the sine function, and different preset frequencies are set to create light source brightness functions under the alternating-current power supply of different frequencies, to simulate and generate, under different light source conditions, a flicker banding image generated by photographing by using a high-speed shutter.

As shown in FIG. 3, an embodiment of this application provides an image generation method 300. The method further limits step S130 in the embodiment of FIG. 1. In this embodiment of this application, the preset parameter includes a photographing frequency and an exposure duration, and step S130 includes the following steps:

S331: Determine an exposure start moment of pixel points in an $i^{th}$ row according to the photographing frequency, i=1, . . . M.

Considering that in reality, exposure of the camera device is usually "rolling shutter" exposure, a light entering amount of pixel points in each row is related to two factors: an exposure start moment and an exposure duration. An exposure start moment of each row is determined by the photographing frequency. Therefore, the photographing frequency may be preset, to determine the exposure start moment of the pixel points in each row.

S332: Determine an exposure end moment of the pixel points in the $i^{th}$ row according to the exposure start moment of the pixel points in the $i^{th}$ row and the exposure duration.

An exposure end moment of the pixel points in each row is determined according to the exposure start moment of the pixel points in each row and the preset exposure duration. In this case, exposure start moments and exposure end moments of the pixel points in the M rows constitute M time domain intervals.

S333: Perform the time-domain integral operation on the light source brightness function for M times according to the exposure start moment of the pixel points in the $i^{th}$ row and the exposure end moment of the pixel points in the $i^{th}$ row, to obtain the M brightness values.

The time-domain integral operation is performed on the light source brightness function for M times based on the M time domain intervals, so that M brightness values corresponding to the pixel points in the M rows may be obtained.

For example, when it is determined that the light source brightness function is L=|sin(at)|, the time-domain integral operation is performed on the light source brightness function for M times, to determine the brightness values corresponding to the pixel points in the M rows in the second image. A brightness value corresponding to the pixel points in each row may be expressed as:

$$P_i = \int_{T_i}^{T_i + t_p} |\sin(at)| dt$$

Pi represents the brightness value corresponding to the pixel point in the $i^{th}$ row, i=1, . . . M, Ti represents the exposure start moment that is of the $i^{th}$ row and that is determined by the photographing frequency, and tp represents an exposure duration of each row.

In this embodiment of this application, steps S310, S320, S340, and S350 may use the descriptions of steps S110, S120, S140, and S150 in the embodiment of FIG. 1, and step S320 may further use the description of step S220 in the embodiment of FIG. 2. Details are not described herein again.

In this case, an exposure start moment of pixel points in an $i^{th}$ row is determined according to the photographing frequency, i=1, . . . M; an exposure end moment of the pixel points in the $i^{th}$ row is determined according to the exposure start moment of the pixel points in the $i^{th}$ row and the exposure duration; and the time-domain integral operation is performed on the light source brightness function for M times according to the exposure start moment of the pixel points in the $i^{th}$ row and the exposure end moment of the pixel points in the $i^{th}$ row, to obtain the M brightness values. In this way, different photography conditions can be simulated by setting different photographing frequencies and exposure durations, to simulate and generate, under different photography conditions, a flicker banding image generated by photography by using a high-speed shutter.

As shown in FIG. 4, an embodiment of this application provides an image generation method 400. The method further limits step S140 in the embodiment of FIG. 1 and includes the following steps:

S441: Determine, based on the M brightness values, a brightness value of a $j^{th}$ pixel point in an $i^{th}$ row according to a Poisson distribution, i=1, . . . M, and j=1, . . . N.

Considering that in reality, a light entering amount of each pixel point may be interfered by various factors, and brightness values of the pixel points in each row are not exactly the same, may randomly fluctuate within a range, and obeys Poisson distribution. Therefore, in this embodiment of this application, when the second image is generated based on the M brightness values, the brightness value of the $j^{th}$ pixel point in the $i^{th}$ row is further determined according to Poisson distribution.

For example, a brightness value corresponding to the pixel points in each row is determined as follows:

$$P_i = \int_{T_i}^{T_i+t_p} |\sin(at)| dt$$

Based on the above, the brightness value of the $j^{th}$ pixel point in the $i^{th}$ row is determined according to Poisson distribution, which is expressed as follows:

$$\hat{P}_{i,j} = \rho(i, j) \int_{T_i}^{T_i+t_p} |\sin(at)| dt$$

$\hat{P}_{ij}$ represents the brightness value of the $j^{th}$ pixel point in the $i^{th}$ row, and $\rho(i,j)$ represents an influence coefficient of the $j^{th}$ pixel point in the $i^{th}$ row under Poisson distribution.

In this way, based on step S441, randomness of the pixel points in each row in the second image is enhanced, so that brightness values of the pixel points in each row in the second image is closer to an actual situation, as shown in FIG. 7.

S442: Generate the second image according to the brightness value of the $j^{th}$ pixel point in the $i^{th}$ row.

Because the brightness value of the $j^{th}$ pixel point in the $i^{th}$ row is closer to the actual situation, the second image generated according to the brightness value of the $j^{th}$ pixel point in the $i^{th}$ row is closer to the actual situation, so that the flicker banding image generated by fusing the first image and the second image is closer to the actual situation.

In this embodiment of this application, steps S410 to S430, and S450 may use the descriptions of steps S110 to S130, and S150 in the embodiment of FIG. 1, step S420 may further use the description of step S220 in the embodiment of FIG. 2, and step S430 may further use the descriptions of steps S331 to S333 in the embodiment of FIG. 3. Details are not described herein again.

In this case, based on the M brightness values, a brightness value of a $j^{th}$ pixel point in an $i^{th}$ row is determined according to a Poisson distribution, i=1, . . . M, and j=1, . . . N; and The second image is generated according to the brightness value of the $j^{th}$ pixel point in the $i^{th}$ row, so that according to a light entering property of each pixel point, a brightness value of the pixel points in each row in the second image random fluctuates within a range, thereby making the flicker banding image fused based on the second image is closer to the actual situation.

As shown in FIG. 5, an embodiment of this application provides an image generation method 500. The method further limits step S150 in the embodiment of FIG. 1 and includes the following steps:

S551: Determine whether there is a point light source in the first image.

Whether there is a point light source in the first image is detected, and a detection manner is not limited in this embodiment of this application. Considering that in reality, if there is a point light source in a photographing scenario, the point light source may directly affect the brightness near the point light source, and in other words, existence of the point light source may destroy distribution of light and dark strips. However, the second image generated in step S540 is a stripe image, and influence of the point light source is not considered. In view of this, it is necessary to determine whether there is a point light source in the first image. If there is a point light source, influence of the point light source on the light and dark strips may be superimposed on the second image based on the point light source in the first image.

S552: If there is a point light source in the first image, adjust, according to two-dimensional Gaussian distribution, a brightness value of a corresponding position in the second image based on a position and strength of the point light source in the first image, to obtain a third image.

If there is a point light source in the first image, a position $P_{loc}(x,y)$ and strength $P_s(x,y)$ of the point light source in the first image is determined. Since the point light source obeys two-dimensional Gaussian distribution, according to two-dimensional Gaussian distribution, the brightness value of the corresponding position in the second image is adjusted based on the position and the strength of the point light source in the first image. Specifically, a brightness value of the point light source may be first simulated.

$$P(i, j) = \frac{A}{2\pi\sigma} \exp\left(\frac{-\left((i - loc_x)^2 + (j - loc_y)^2\right)}{2\sigma^2}\right)$$

$P(i,j)$ represents a brightness value of the point light source at the $j^{th}$ pixel point in the $i^{th}$ row, A represents an empirical intensity coefficient, $loc_x$ and $loc_y$ represent the position of the point light source, and $\sigma$ represents an empirical attenuation coefficient.

Figure 8A:
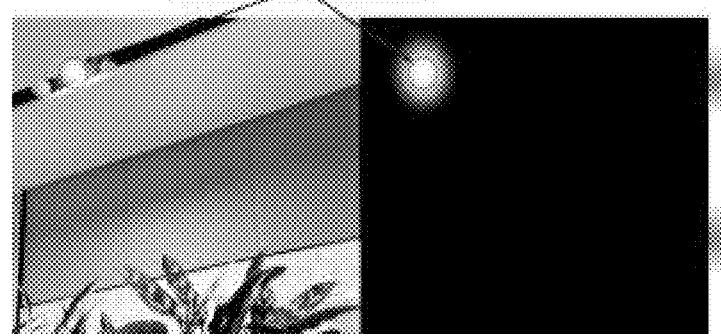
FIG. 8a and FIG. 8b are schematic diagrams of fusing a flicker banding image according to an embodiment of this application.

Then, the brightness value of the point light source is superimposed on the second image, to generate the third image, as shown in FIG. 8a.

S553: Fuse the first image and the third image into the flicker banding image.

Figure 8B:

Since the third image superimposes the influence of point light source based on the stripe image, distribution of the light and dark strips in the third image is closer to the actual situation, and the flicker banding image generated by fusing the first image and the third image is closer to the actual situation. The fused flicker banding image is shown in FIG. 8b.

In this embodiment of this application, steps S510 to S540 may use the descriptions of steps S110 to S140 in the embodiment of FIG. 1, step S520 may further use the description of step S220 in the embodiment of FIG. 2, step S530 may further use the descriptions of steps S331 to S333 in the embodiment of FIG. 3, and step S540 may further use the descriptions of steps S441 and S442 in the embodiment of FIG. 4. Details are not described herein again.

In this case, whether there is a point light source in the first image is determined; if there is a point light source in the first image, according to two-dimensional Gaussian distribution, a brightness value of a corresponding position in the second image is adjusted based on a position and strength of the point light source in the first image, to obtain a third image; and the flicker banding image is generated by fusing the first image and the third image. In this way, an actual impact of the point light source on the distribution of the light and dark strips can be simulated, so that the fused flicker banding image is closer to the actual situation.

As shown in FIG. 6, an embodiment of this application provides an image generation method 600. The method further limits step S150 in the embodiment of FIG. 1 and includes the following steps:

S651: Determine a brightness coefficient based on a brightness value of the first image.

In this embodiment of this application, considering that the brightness value of the second image needs to match the brightness value of the first image, for example, the first image is photographed in a darker scenario, the brightness of the generated second image also needs to be darker, so that the fused flicker banding image may be closer to the actual situation. Therefore, before the first image and the second image are fused, a brightness coefficient may be determined based on the brightness value of the first image, where the brightness coefficient is used for adjusting the brightness value of the second image, to make the overall brightness of the generated stripe image better fit the brightness of the photographing scenario of the first image.

In an implementation, the first image is converted into a grayscale image, and average grayscale value of the grayscale image is calculated and normalized to an interval from 0 to 1, to obtain a brightness coefficient.

S652: Adjust a brightness value of the second image according to the brightness coefficient, to obtain a fourth image.

A brightness value of each pixel point in the second image is multiplied by the brightness coefficient, to obtain a fourth image.

S653: Fuse the first image and the fourth image into the flicker banding image.

Since the overall brightness of the fourth image is adjusted based on the brightness coefficient, the overall brightness of the fourth image is closer to the brightness of the photographing scenario of the first image, and the flicker banding image generated by fusing the first image and the fourth image is closer to the actual situation.

In an implementation, steps S551 and S552 may further be included before step S653, and steps S551 and S552 may be before step S651 or after step S652.

In this embodiment of this application, steps S610 to S640 may use the descriptions of steps S110 to S140 in the embodiment of FIG. 1, step S620 may further use the description of step S220 in the embodiment of FIG. 2, step S630 may further use the descriptions of steps S331 to S333 in the embodiment of FIG. 3, and step S640 may further use the descriptions of steps S441 and S442 in the embodiment of FIG. 4. Details are not described herein again.

In this case, a brightness coefficient is determined based on a brightness value of the first image; a brightness value of the second image is adjusted according to the brightness coefficient, to obtain a fourth image; and the flicker banding image is generated by fusing the first image and the fourth image. In this way, based on the overall brightness of the first image, the brightness of the light and dark strips may better fits the actual brightness of the photographing scenario, and the fused flicker banding image may be closer to the actual situation.

It is to be noted that, an execution entity of the image generation method provided in the embodiments of this application may be an image generation apparatus, or may be a control module in the image generation apparatus for performing the image generation method. The image generation apparatus provided in the embodiments of this application is described in the embodiments of this application by using an example in which the image generation apparatus performs the image generation method.

Figures 9, 10:
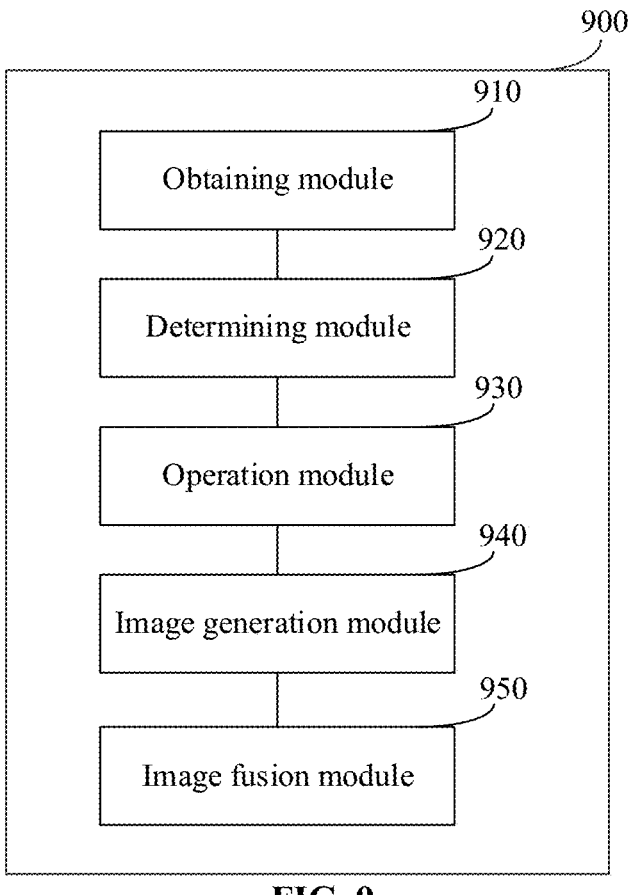
FIG. 9 is a schematic structural diagram of an image generation apparatus according to an embodiment of this application.
FIG. 10 is a schematic structural diagram of an electronic device according to another embodiment of this application.

FIG. 9 is a schematic structural diagram of an image generation apparatus according to an embodiment of this application. As shown in FIG. 9, an image generation apparatus 900 includes an obtaining module 910, a determining module 920, an operation module 930, an image generation module 940, and an image fusion module 950.

The obtaining module 910 is configured to obtain a first image, the first image including M×N pixel points, where M and N are positive integers. The determining module 920 is configured to determine a light source brightness function. The operation module 930 is configured to perform, based on a preset parameter, a time-domain integral operation on the light source brightness function for M times, to obtain M brightness values. The image generation module 940 is configured to generate a second image based on the M brightness values, the second image being a stripe image having M×N pixel points. The image fusion module 950 is configured to fuse the first image and the second image into a flicker banding image.

In an implementation, the determining module is configured to create the light source brightness function according to a preset frequency, where the light source brightness function is a sine function.

In an implementation, the preset parameter includes a photographing frequency and an exposure duration, and the operation module is configured to: determine an exposure start moment of pixel points in an $i^{th}$ row according to the photographing frequency, i=1, . . . M; determine an exposure end moment of the pixel points in the $i^{th}$ row according to the exposure start moment of the pixel points in the $i^{th}$ row and the exposure duration; and perform the time-domain integral operation on the light source brightness function for M times according to the exposure start moment of the pixel points in the $i^{th}$ row and the exposure end moment of the pixel points in the $i^{th}$ row, to obtain the M brightness values.

In an in an implementation, the image generation module is configured to: determine, based on the M brightness values, a brightness value of a $j^{th}$ pixel point in an $i^{th}$ row according to a Poisson distribution, i=1, . . . M, and j=1, . . . N; and generate the second image according to the brightness value of the $j^{th}$ pixel point in the $i^{th}$ row.

In an implementation, the image fusion module is configured to: determine whether there is a point light source in the first image; if there is a point light source in the first image, adjust, according to a two-dimensional Gaussian distribution, a brightness value of a corresponding position in the second image based on a position and strength of the point light source in the first image, to obtain a third image; and fuse the first image and the third image into the flicker banding image.

In an implementation, the image fusion module is configured to: determine a brightness coefficient based on a brightness value of the first image; adjust a brightness value of the second image according to the brightness coefficient, to obtain a fourth image; and fuse the first image and the fourth image into the flicker banding image.

In this way, according to an image generation apparatus provided in this embodiment of this application, a first image is obtained, the first image including M×N pixel points, where M and N are positive integers; a light source brightness function is determined; a time-domain integral operation is performed on the light source brightness function for M times based on a preset parameter, to obtain M brightness values; a second image is generated based on the M brightness values, the second image being a stripe image having M×N pixel points, where brightness values of pixel points in M rows in the second image respectively correspond to the M brightness values; and the first image and the second image are fused into a flicker banding image. In this case, according to a generation principle of a stroboscopic strip, a flicker banding image paired with the first image can be generated through simulation, and based on different light source brightness functions and a plurality of sets of preset parameters, a large amount of non-repeated flicker banding images paired with the first image can be generated through simulation, so that requirements for algorithm research are met, and there is no need to use the camera device to photograph a high shutter-speed image in a same scenario as the first image to generate the flicker banding image, thereby resolving a problem that there is a difficulty in obtaining a large amount of paired pieces of training data and obtaining the training data in a dynamic scenario.

The image generation apparatus in the embodiments of this application may be an apparatus, or may be a component, an integrated circuit, or a chip in the terminal. The apparatus may be a mobile electronic device, or may be a non-mobile electronic device. For example, the mobile electronic device may be a mobile phone, a tablet computer, a notebook computer, a palm computer, an in-vehicle electronic device, a wearable device, an ultra-mobile personal computer (UMPC), a netbook, or a personal digital assistant (PDA); and the non-mobile electronic device may be a server, a network attached storage (NAS), a personal computer (PC), a television (TV), a teller machine, or an automated machine, which are not specifically limited in the embodiments of this application.

The image generation apparatus in the embodiments of this application may be an apparatus having an operating system. The operating system may be an Android operating system, may be an ios operating system, or may be another possible operating system, and is not specifically limited in the embodiments of this application.

The image generation apparatus provided in the embodiments of this application can implement the processes implemented in the method embodiments of FIG. 1 to FIG. 6, which may not be described in detail herein again to avoid repetition.

Optionally, as shown in FIG. 10, an embodiment of this application further provides an electronic device 1000, including a processor 1001, a memory 1002, and a program or instructions stored in the memory 1002 and runnable on the processor 1001, the program or instructions, when executed by the processor 1001, implementing the processes of the embodiments of the image generation method, and achieving the same technical effect. To avoid repetition, details are not described herein again.

It is to be noted that, the electronic device in the embodiments of this application includes the mobile electronic device and the non-mobile electronic device.

Figure 11:
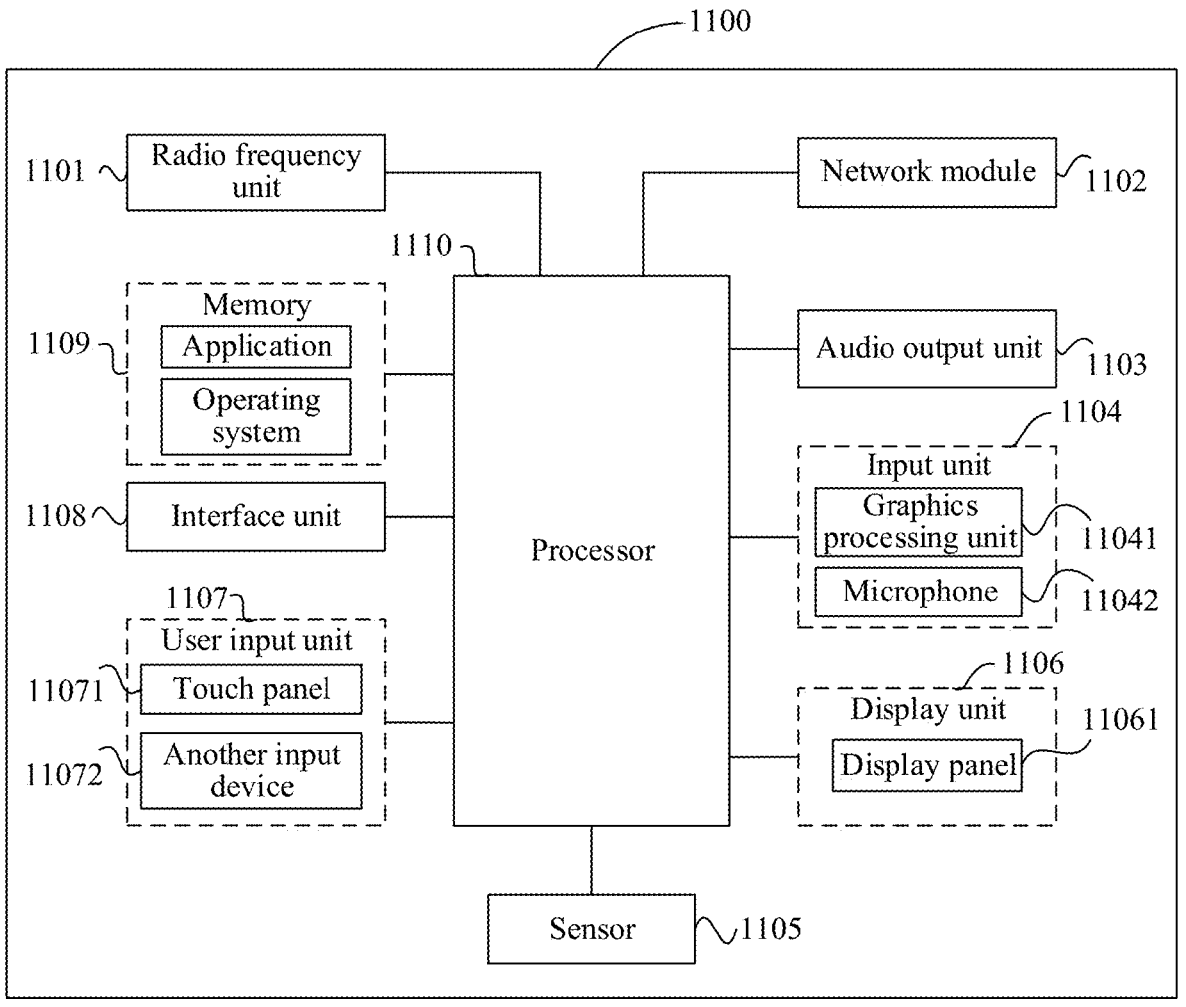
FIG. 11 is a schematic structural diagram of hardware of an electronic device according to another embodiment of this application.

FIG. 11 is a schematic diagram of a hardware structure of an electronic device implementing an embodiment of this application.

The electronic device 1100 includes, but is not limited to, components such as a radio frequency unit 1101, a network module 1102, an audio output unit 1103, an input unit 1104, a sensor 1105, a display unit 1106, a user input unit 1107, an interface unit 1108, a memory 1109, and a processor 1110.

A person skilled in the art may understand that, the electronic device 1100 may further include a power supply (such as a battery) for supplying power to the components. Preferably, the power supply may be logically connected to the processor 1110 by using a power management system, thereby implementing functions such as charging, discharging, and power consumption management by using the power management system. The electronic device structure shown in FIG. 11 does not constitute a limitation to the electronic device. The electronic device may include more or fewer components than those shown in the figure, or some components may be combined, or a different component deployment may be used. Details are not described herein again.

The processor 1110 is configured to obtain a first image, the first image including M×N pixel points, where M and N are positive integers; determine a light source brightness function; perform, based on a preset parameter, a time-domain integral operation on the light source brightness function for M times, to obtain M brightness values; generate a second image based on the M brightness values, the second image being a stripe image having M×N pixel points, where brightness values of pixel points in M rows in the second image respectively correspond to the M brightness values; and fuse the first image and the second image into a flicker banding image.

In an implementation, the processor 1110 is configured to create the light source brightness function according to a preset frequency, where the light source brightness function is a sine function.

In an implementation, the preset parameter includes a photographing frequency and an exposure duration, and the processor 1110 is configured to: determine an exposure start moment of pixel points in an $i^{th}$ row according to the photographing frequency, i=1, . . . M; determine an exposure end moment of the pixel points in the $i^{th}$ row according to the exposure start moment of the pixel points in the $i^{th}$ row and the exposure duration; and perform the time-domain integral operation on the light source brightness function for M times according to the exposure start moment of the pixel points in the $i^{th}$ row and the exposure end moment of the pixel points in the $i^{th}$ row, to obtain the M brightness values.

In an implementation, the processor 1110 is configured to: determine, based on the M brightness values, a brightness value of a $j^{th}$ pixel point in an $i^{th}$ row according to a Poisson distribution, i=1, . . . M, and j=1, . . . N; and generate the second image according to the brightness value of the $j^{th}$ pixel point in the $i^{th}$ row.

In an implementation, the processor 1110 is configured to: determine whether there is a point light source in the first image; if there is a point light source in the first image, adjust, according to two-dimensional Gaussian distribution, a brightness value of a corresponding position in the second image based on a position and strength of the point light source in the first image, to obtain a third image; and fuse the first image and the third image into the flicker banding image.

In an implementation, the processor 1110 is configured to: determine a brightness coefficient based on a brightness value of the first image; adjust a brightness value of the second image according to the brightness coefficient, to obtain a fourth image; and fuse the first image and the fourth image into the flicker banding image.

It may be understood that, in the embodiments of this application, the input unit 1104 may include a graphics processing unit (GPU) 11041 and a microphone 11042. The graphics processing unit 11041 processes image data of a static picture or a video obtained by an image capturing apparatus (for example, a camera) in a video capturing mode or an image capturing mode. The display unit 1106 may include a display panel 11061, for example, a display panel 11061 configured in a form such as a liquid crystal display or an organic light-emitting diode. The user input unit 1107 includes a touch panel 11071 and another input device 11072. The touch panel 11071 is also referred to as a touchscreen. The touch panel 11071 may include two parts: a touch detection apparatus and a touch controller. The another input device 11072 may include, but is not limited to, a physical keyboard, a functional key (such as a volume control key or a switch key), a track ball, a mouse, and a joystick, and the details will not be described herein again. The memory 1109 may be configured to store a software program and various data, including but not limited to an application or an operating system. The processor 1110 may integrate an application processor and a modem processor. The application processor mainly processes an operating system, a user interface, an application, and the like. The modem processor mainly processes wireless communication. It may be understood that the foregoing modem may either not be integrated into the processor 1110.

An embodiment of this application further provides a readable storage medium, storing a program or instructions, the program or instructions, when executed by a processor, implementing the processes of the embodiments of the image generation method, and achieving the same technical effect. To avoid repetition, details are not described herein again.

The processor is a processor in the electronic device in the foregoing embodiments. The readable storage medium includes a computer-readable storage medium, for example, a read-only memory (ROM), a random access memory (RAM), a magnetic disk, an optical disk, or the like.

An embodiment of this application further provides a chip, including a processor and a communication interface coupled to each other, the processor being configured to run a program or instructions to implement the processes of the embodiments of the image generation method, and can achieve the same technical effects. To avoid repetition, details are not described herein again.

It may be understood that, the chip mentioned in this embodiment of this application may also be referred to as a system-level chip, a system chip, a chip system, a system on chip, or the like.

An embodiment of this application further provides a computer program product, including a processor, a memory, and a program or instructions stored in the memory and runnable on the processor, the program or instructions, when executed by the processor, implementing the processes of the embodiments of the image generation method, and achieving the same technical effect. To avoid repetition, details are not described herein again.

An embodiment of this application further provides an electronic device, where the electronic device is configured to perform the processes of the embodiments of the image generation method, and can achieve the same technical effects. To avoid repetition, details are not described herein again.

It is to be noted that, the term such as "include", "comprise", or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Unless otherwise specified, elements defined by the sentence "including one" does not exclude that there are still other same elements in the processes, methods, objects, or apparatuses. In addition, it is to be noted that, the scope of the method and the apparatus in the embodiments of this application is not limited to executing functions in an order shown or discussed, and may also include executing the functions in a substantially simultaneous manner or in a reverse order according to involved functions. For example, the described method may be performed in an order different from that described order, and various steps may also be added, omitted, or combined. In addition, features described with reference to some examples may also be combined in other examples.

According to the descriptions of the foregoing embodiments, a person skilled in the art may clearly understand that the method according to the foregoing embodiments may be implemented by means of software and a necessary general hardware platform, and certainly, may alternatively be implemented by hardware, but in many cases, the former manner is a better implementation. Based on such an understanding, the technical solutions of this application essentially or the part contributing to the related art may be implemented in the form of a computer software product. The computer software product is stored in a storage medium (such as a read-only memory (ROM)/random access memory (RAM), a magnetic disk, or an optical disc), and includes several instructions for instructing a terminal (which may be a mobile phone, a computer, a server, a network device, or the like) to perform the method described in the embodiments of this application.

The embodiments of this application are described above with reference to the accompanying drawings. However, this application is not limited to the foregoing specific implementations. The foregoing specific implementations are merely illustrative rather than limitative. A person of ordinary skill in the art may derive various forms from this application without departing from the spirit of this application and the scope claimed by the claims, which are all under the protection of this application.

What is claimed is:

1. An image generation method, comprising:
   obtaining a first image, the first image comprising M×N pixel points, wherein M and N are positive integers;
   determining a light source brightness function;
   performing, based on a preset parameter, a time-domain integral operation on the light source brightness function for M times, to obtain M brightness values;
   generating a second image based on the M brightness values, the second image being a stripe image having M×N pixel points, wherein brightness values of pixel points in M rows in the second image respectively correspond to the M brightness values; and fusing the first image and the second image into a flicker banding image.

2. The method according to claim 1, wherein the preset parameter comprises a photographing frequency and an exposure duration, and the performing, based on a preset parameter, a time-domain integral operation on the light source brightness function for M times, to obtain M brightness values comprises:

determining an exposure start moment of pixel points in an $i^{th}$ row according to the photographing frequency, i=1, . . . M;

determining an exposure end moment of the pixel points in the $i^{th}$ row according to the exposure start moment of the pixel points in the $i^{th}$ row and the exposure duration; and performing the time-domain integral operation on the light source brightness function for M times according to the exposure start moment of the pixel points in the $i^{th}$ row and the exposure end moment of the pixel points in the $i^{th}$ row, to obtain the M brightness values.

3. The method according to claim 1, wherein the determining a light source brightness function comprises:

creating the light source brightness function according to a preset frequency, wherein the light source brightness function is a sine function.

4. The method according to claim 1, wherein the generating a second image based on the M brightness values comprises:

determining, based on the M brightness values, a brightness value of a $j^{th}$ pixel point in an $i^{th}$ row according to a Poisson distribution, i=1, . . . M, and j=1, . . . N; and generating the second image according to the brightness value of the $j^{th}$ pixel point in the $i^{th}$ row.

5. The method according to claim 1, wherein the fusing the first image and the second image into a flicker banding image comprises:

determining whether there is a point light source in the first image;

if there is a point light source in the first image, adjusting, according to two-dimensional Gaussian distribution, a brightness value of a corresponding position in the second image based on a position and strength of the point light source in the first image, to obtain a third image; and fusing the first image and the third image into the flicker banding image.

6. The method according to claim 1, wherein the fusing the first image and the second image into a flicker banding image comprises:

determining a brightness coefficient based on a brightness value of the first image;

adjusting a brightness value of the second image according to the brightness coefficient, to obtain a fourth image; and fusing the first image and the fourth image into the flicker banding image.

7. An electronic device, comprising a processor, a memory, and a program or instructions stored in the memory and executable on the processor, wherein the program or instructions, when executed by the processor, causes the processor to perform:

obtaining a first image, the first image comprising M×N pixel points, wherein M and N are positive integers;

determining a light source brightness function;

performing, based on a preset parameter, a time-domain integral operation on the light source brightness function for M times, to obtain M brightness values;

generating a second image based on the M brightness values, the second image being a stripe image having M×N pixel points, wherein brightness values of pixel points in M rows in the second image respectively correspond to the M brightness values; and fusing the first image and the second image into a flicker banding image.

8. The electronic device according to claim 7, wherein the preset parameter comprises a photographing frequency and an exposure duration;

when performing, based on a preset parameter, a time-domain integral operation on the light source brightness function for M times, to obtain M brightness values, the program or instructions, when executed by the processor, causes the processor to perform:

determining an exposure start moment of pixel points in an $i^{th}$ row according to the photographing frequency, i=1, . . . M;

determining an exposure end moment of the pixel points in the $i^{th}$ row according to the exposure start moment of the pixel points in the $i^{th}$ row and the exposure duration; and performing the time-domain integral operation on the light source brightness function for M times according to the exposure start moment of the pixel points in the $i^{th}$ row and the exposure end moment of the pixel points in the $i^{th}$ row, to obtain the M brightness values.

9. The electronic device according to claim 7, wherein when determining a light source brightness function, the program or instructions, when executed by the processor, causes the processor to perform:

creating the light source brightness function according to a preset frequency, wherein the light source brightness function is a sine function.

10. The electronic device according to claim 7, wherein when generating a second image based on the M brightness values, the program or instructions, when executed by the processor, causes the processor to perform:

determining, based on the M brightness values, a brightness value of a $j^{th}$ pixel point in an $i^{th}$ row according to a Poisson distribution, i=1, . . . M, and j=1, . . . N; and generating the second image according to the brightness value of the $j^{th}$ pixel point in the $i^{th}$ row.

11. The electronic device according to claim 7, wherein when fusing the first image and the second image into a flicker banding image, the program or instructions, when executed by the processor, causes the processor to perform:

determining whether there is a point light source in the first image;

if there is a point light source in the first image, adjusting, according to two-dimensional Gaussian distribution, a brightness value of a corresponding position in the second image based on a position and strength of the point light source in the first image, to obtain a third image; and fusing the first image and the third image into the flicker banding image.

12. The electronic device according to claim 7, wherein when fusing the first image and the second image into a flicker banding image, the program or instructions, when executed by the processor, causes the processor to perform:

determining a brightness coefficient based on a brightness value of the first image;

adjusting a brightness value of the second image according to the brightness coefficient, to obtain a fourth image; and fusing the first image and the fourth image into the flicker banding image.

13. A non-transitory readable storage medium, storing a program or instructions, wherein the program or instructions, when executed by a processor, cause the processor to perform:

obtaining a first image, the first image comprising M×N pixel points, wherein M and N are positive integers;

determining a light source brightness function;

performing, based on a preset parameter, a time-domain integral operation on the light source brightness function for M times, to obtain M brightness values;

generating a second image based on the M brightness values, the second image being a stripe image having M×N pixel points, wherein brightness values of pixel points in M rows in the second image respectively correspond to the M brightness values; and fusing the first image and the second image into a flicker banding image.

14. The non-transitory readable storage medium according to claim 13, wherein the preset parameter comprises a photographing frequency and an exposure duration;

when the performing, based on a preset parameter, a time-domain integral operation on the light source brightness function for M times, to obtain M brightness values, the program or instructions, when executed by the processor, cause the processor to perform:

determining an exposure start moment of pixel points in an $i^{th}$ row according to the photographing frequency, $i=1, \ldots M$;

determining an exposure end moment of the pixel points in the $i^{th}$ row according to the exposure start moment of the pixel points in the $i^{th}$ row and the exposure duration; and performing the time-domain integral operation on the light source brightness function for M times according to the exposure start moment of the pixel points in the $i^{th}$ row and the exposure end moment of the pixel points in the $i^{th}$ row, to obtain the M brightness values.

15. The non-transitory readable storage medium according to claim 13, wherein when determining a light source brightness function, the program or instructions, when executed by the processor, cause the processor to perform:

creating the light source brightness function according to a preset frequency, wherein the light source brightness function is a sine function.

16. The non-transitory readable storage medium according to claim 13, wherein when generating a second image based on the M brightness values, the program or instructions, when executed by the processor, cause the processor to perform:

determining, based on the M brightness values, a brightness value of a $j^{th}$ pixel point in an $i^{th}$ row according to a Poisson distribution, $i=1, \ldots M$, and $j=1, \ldots N$; and generating the second image according to the brightness value of the $j^{th}$ pixel point in the $i^{th}$ row.

17. The non-transitory readable storage medium according to claim 13, wherein when fusing the first image and the second image into a flicker banding image, the program or instructions, when executed by the processor, cause the processor to perform:

determining whether there is a point light source in the first image;

if there is a point light source in the first image, adjusting, according to two-dimensional Gaussian distribution, a brightness value of a corresponding position in the second image based on a position and strength of the point light source in the first image, to obtain a third image; and fusing the first image and the third image into the flicker banding image.

18. The non-transitory readable storage medium according to claim 13, wherein when fusing the first image and the second image into a flicker banding image, the program or instructions, when executed by the processor, cause the processor to perform:

determining a brightness coefficient based on a brightness value of the first image;

adjusting a brightness value of the second image according to the brightness coefficient, to obtain a fourth image; and fusing the first image and the fourth image into the flicker banding image.

19. A chip, comprising a processor and a communication interface, wherein the communication interface is coupled to the processor, and the processor is configured to run a program or instructions to implement the steps of the method according to claim 1.

* * * * *